United States Patent
Squillante et al.

(10) Patent No.: US 12,217,166 B2
(45) Date of Patent: Feb. 4, 2025

(54) MARKOV PROCESSES USING ANALOG CROSSBAR ARRAYS

(71) Applicant: INTERNATIONAL BUSINESS MACHINES CORPORATION, Armonk, NY (US)

(72) Inventors: Mark S. Squillante, Greenwich, CT (US); Ogunzhan Murat Onen, Boston, MA (US); Tayfun Gokmen, Briarcliff Manor, NY (US); Vasileios Kalantzis, White Plains, NY (US); Tomasz J. Nowicki, Fort Montgomery, NY (US); Wilfried Haensch, Somers, NY (US); Lior Horesh, North Salem, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 934 days.

(21) Appl. No.: 17/321,617

(22) Filed: May 17, 2021

(65) Prior Publication Data
US 2022/0366230 A1  Nov. 17, 2022

(51) Int. Cl.
*G06N 3/065* (2023.01)
*G06F 7/523* (2006.01)
(Continued)

(52) U.S. Cl.
CPC .............. *G06N 3/065* (2023.01); *G06F 7/523* (2013.01); *G06F 17/16* (2013.01); *G06N 3/047* (2023.01)

(58) Field of Classification Search
CPC ........ G06N 3/065; G06N 3/047; G06F 7/523; G06F 17/16
See application file for complete search history.

(56) References Cited

U.S. PATENT DOCUMENTS 6,847,921 B2   1/2005   Woronow et al.
7,459,933 B2  12/2008   Mouttet
(Continued)

FOREIGN PATENT DOCUMENTS

JP    2004094331 A  *  3/2004
WO   2000/026786 A1    5/2000

OTHER PUBLICATIONS

Wang et al. "A fast and effective memristor-based method for finding approximate eigenvalues and eigenvectors of non-negative matrices," 2018 IEEE computer society annual symposium on VLSI (ISVLSI). IEEE, 2018 (Year: 2018).*

(Continued)

*Primary Examiner* — Shahid K Khan
(74) *Attorney, Agent, or Firm* — Tutunjian & Bitetto, P.C.; Erik Johnson

(57) ABSTRACT

A method is presented for computing an equilibrium distribution of Markov processes. The method includes storing weight values in an analog crossbar array of transition probability matrices, where the analog crossbar array of transition probability matrices represents a weight matrix with m rows and n columns, computing an eigenvector associated with a real eigenvalue of modulus one for each of the transition probability matrices, applying a gradient-based eigenvalue solver to converge to a dominant eigenpair, and determining a probability of changing from one state to another state in a stochastic entity based on outcomes of the gradient-based eigenvalue solver.

20 Claims, 9 Drawing Sheets

(51) Int. Cl.
*G06F 17/16* (2006.01)
*G06N 3/047* (2023.01)

(56) References Cited

U.S. PATENT DOCUMENTS

| | | | |
|---|---|---|---|
| 9,009,095 | B1 | 4/2015 | Fafri et al. |
| 9,847,124 | B2 | 12/2017 | Hu et al. |
| 10,452,972 | B2 | 10/2019 | Degraeve et al. |
| 2002/0198995 | A1* | 12/2002 | Liu .................... H04L 41/5003 709/226 |
| 2006/0053039 | A1* | 3/2006 | Gamarnik ........ G06Q 10/06393 705/7.11 |
| 2010/0239103 | A1* | 9/2010 | Barbotin ................ H04B 1/719 381/94.1 |
| 2010/0240309 | A1* | 9/2010 | Barbotin ........... H04L 25/03006 455/41.3 |
| 2013/0018829 | A1* | 1/2013 | Dieker .................... G06N 7/01 706/14 |
| 2013/0243046 | A1* | 9/2013 | Vetterli ............... H04L 25/0204 375/267 |
| 2015/0106310 | A1* | 4/2015 | Birdwell ................ G06N 3/086 706/26 |
| 2015/0169985 | A1* | 6/2015 | Burger .................... G06T 7/136 382/133 |
| 2019/0228327 | A1* | 7/2019 | Horesh .............. G05B 13/0265 |
| 2020/0349459 | A1* | 11/2020 | Cao ........................ G06N 10/00 |
| 2021/0151678 | A1* | 5/2021 | Lee .................... H10N 70/8845 |

OTHER PUBLICATIONS

Mell et al., "The NIST Definition of Cloud Computing", National Institute of Standards and Technology, Special Publication 800-145. Sep. 2011. pp. 1-7.

* cited by examiner

MARKOV PROCESSES USING ANALOG CROSSBAR ARRAYS

BACKGROUND

The present invention relates generally to Markov processes, and more specifically, to using analog crossbar arrays employing transition probability matrices of Markov processes.

A Markov process is a random process in which the future is independent of the past, given the present. Thus, Markov processes are the natural stochastic analogs of the deterministic processes described by differential and difference equations. Markov chains are an important mathematical tool in stochastic processes. The underlying idea is the Markov Property, that is, that some predictions about stochastic processes can be simplified by viewing the future as independent of the past, given the present state of the process. This is used to simplify predictions about the future state of a stochastic process.

SUMMARY

In accordance with an embodiment, a method is provided for computing an equilibrium distribution of Markov processes. The method includes storing weight values in an analog crossbar array of transition probability matrices, where the analog crossbar array of transition probability matrices represents a weight matrix with m rows and n columns, computing an eigenvector associated with a real eigenvalue of modulus one for each of the transition probability matrices, applying a gradient-based eigenvalue solver to converge to a dominant eigenpair, and determining a probability of changing from one state to another state in a stochastic entity based on outcomes of the gradient-based eigenvalue solver.

In accordance with another embodiment, a method is provided for computing an equilibrium distribution of Markov processes. The method includes storing weight values in an analog crossbar array of transition probability matrices, wherein the analog crossbar array of transition probability matrices represents a weight matrix with m rows and n columns, solving an augmented linear system by solving a stochastic gradient descent-based procedure in which the rows of the transition probability matrix are used as data samples, scaling a solution of the augmented linear system so that a sum of its entries is equal to one, and determining a probability of changing from one state to another state in a stochastic entity.

In accordance with yet another embodiment, a computer program product is presented for computing an equilibrium distribution of Markov processes. The computer program product includes a computer readable storage medium having program instructions embodied therewith, the program instructions executable by a computer to cause the computer to store weight values in an analog crossbar array of transition probability matrices, wherein the analog crossbar array of transition probability matrices represents a weight matrix with m rows and n columns, compute an eigenvector associated with a real eigenvalue of modulus one for each of the transition probability matrices, apply a gradient-based eigenvalue solver to converge to a dominant eigenpair, and determine a probability of changing from one state to another state in a stochastic entity based on outcomes of the gradient-based eigenvalue solver.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein.

Throughout the drawings, same or similar reference numerals represent the same or similar elements.

DETAILED DESCRIPTION

Figure 1:
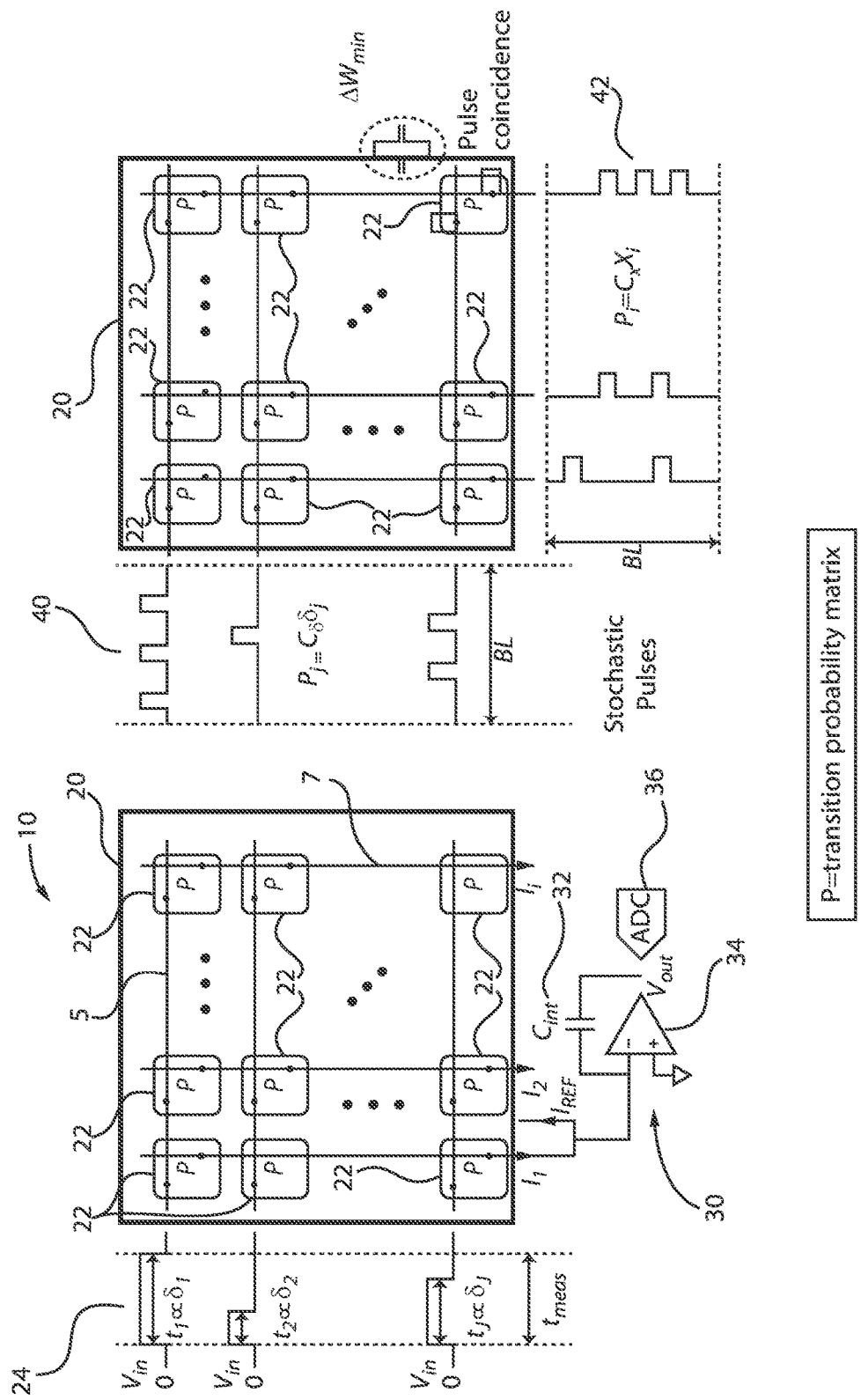
FIG. 1 is an exemplary diagram illustrating an analog crossbar array incorporating transition matrices to compute equilibrium distribution and transient distribution in Markov chains, in accordance with an embodiment of the present invention.

Exemplary embodiments in accordance with the present invention provide methods and devices for computing equilibrium distributions and transient distributions of Markov processes by using analog crossbar arrays. Markov chains are a fundamental part of stochastic processes. Markov chains are used widely in many different disciplines. A Markov chain is a stochastic process that satisfies the Markov property, which means that the past and future are independent when the present is known. This means that if one knows the current state of the process, then no additional information of its past states is required to make the best possible prediction of its future. This simplicity allows for great reduction of the number of parameters when studying such a process. Markov chains are used to compute the probabilities of events occurring by viewing them as states transitioning into other states, or transitioning into the same state as before. When approaching Markov chains there are two different types, that is, discrete-time Markov chains and continuous-time Markov chains. This means that there is one case where changes happen at specific states and one case where changes are continuous.

The exemplary embodiments incorporate Markov chains into analog crossbar arrays. Crossbar arrays, also known as crosspoint arrays or crosswire arrays, are high density, low cost circuit architectures used to form a variety of electronic circuits and devices, including artificial neural network (ANN) architectures, neuromorphic microchips and ultra-high density nonvolatile memory. A basic crossbar array configuration includes a set of conductive row wires and a set of conductive column wires formed to intersect the set of conductive row wires. The intersections between the two sets of wires are separated by so-called crosspoint devices.

Crosspoint devices, in effect, function as the ANN's weighted connections between neurons. Nanoscale two-terminal devices, for example memristors having "ideal" conduction state switching characteristics, are often used as the crosspoint devices in order to emulate synaptic plasticity with high energy efficiency. The conduction state (e.g., resistance) of the ideal memristor material can be altered by controlling the voltages applied between individual wires of the row and column wires. Digital data can be stored by alteration of the memristor material's conduction state at the intersection to achieve a high conduction state or a low conduction state. The memristor material can also be programmed to maintain two or more distinct conduction states by selectively setting the conduction state of the material. The conduction state of the memristor material can be read by applying a voltage across the material and measuring the current that passes through the target crosspoint device.

The exemplary embodiments of the present invention disclose exemplary methods and systems that advantageously incorporate transition probability matrices (instead of memristor material) that represent Markov chains into analog crossbar arrays. The transition probability matrices can be employed to compute equilibrium distributions or transient distributions. Equilibrium distribution of a Markov chain it $\pi=(\pi_k)_{\forall k}$ can be obtained with the transition probability matrix P associated with the Markov chain, for any $\pi_0$, as $$\pi_t = \pi_{t-1}P \text{ and } \pi = \lim_{t \to \infty} \pi_t \Rightarrow \pi = \pi P.$$

Matrix P has special properties where all the entries are nonnegative and the summation of the entries along each row is equal to 1 (P is a stochastic matrix). Matrix P can be very sparse in many Markov chains, which is not ideally represented by analog devices due to the possible loss of sign information. The issue can be interpreted as a single eigenvector solving for $\lambda=1$, namely, where $\pi$ is a row eigenvector of probability matrix P associated with eigenvalue $\lambda=1$. It is noted that all the other eigenvalues of P are complex values within the unit disk, all having a real part strictly less than 1.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

FIG. 1 is an exemplary diagram illustrating an analog crossbar array incorporating transition matrices to compute equilibrium distribution and transient distribution in Markov chains, in accordance with an embodiment of the present invention.

Mathematically, Markov chains include a state space, which is a vector whose elements are all the possible states of a stochastic variable, the present state of the variable, and the transition probability matrix. The transition probability matrix includes all the probabilities that the variable will transition from one state to another, or remain the same for a stochastic entity. To calculate the probabilities of a variable ending up in certain states after n discrete partitions of time, the present state vector is multiplied with the transition probability matrix raised to the power of n. Thus, the transition probability matrix (or transition matrix) represents a Markov chain or Markov process. The probability distribution of state transitions is usually represented as the Markov chain's transition probability matrix. If the Markov chain has N possible states, the matrix will be an N×N matrix, such that entry (I,J) is the probability of transitioning from state I to state J. Additionally, the transition probability matrix must be a stochastic matrix, a matrix whose entries in each row must add up to exactly 1. Thus, the transition probability matrices include all the probabilities that a variable will transition from one state to another, or remain the same for a stochastic entity, the stochastic entity being a stochastic process or event or practical application. The exemplary embodiments of the present invention incorporate the transition probability matrices representing Markov chains into an analog crossbar array.

Regarding analog crossbar arrays, each parameter (weight $w_{ij}$) of an algorithmic weight matrix can be mapped to a single RPU device ($RPU_{ij}$) on hardware, namely a physical crossbar array of RPU devices. In one instance, the analog crossbar array 10 has a series of conductive row wires 5 and a series of conductive column wires 7 oriented orthogonal to, and intersecting, the conductive row wires 5. The intersections of the conductive row wires 5 and column wires 7 are usually separated by RPU devices forming a crossbar array of RPU devices. However, in the instant case, the RPU devices are replaced with transition probability matrix devices 22, each including a transition probability matrix. Each transition probability matrix device 22 can include a first terminal, a second terminal and an active region. A conduction state of the active region identifies a weight value of the transition probability matrix device 22, which can be updated/adjusted by application of a signal to the first/second terminals.

A matrix W with m rows and n columns can be mapped to the transition probability matrix array having M columns and N rows, and, thus, the integration in the figures happens along the columns of the transition probability matrix array, whereas the summing happens mathematically along the row of W. So the mapping of the mathematical W to the transition probability matrix array is in fact transposed. As a result, for ease of displaying purposes, the mathematical row of the matrix W is displayed as the column of the transition probability matrix array. The transition probability matrix devices 22 of the analog crossbar array 10 function as the weighted connections between neurons in the ANN. The transition probability matrix devices 22 can be controlled by adjusting voltages applied between the individual conductive row and column wires 5 and 7.

In machine learning and cognitive science, ANN-based models are a family of statistical learning models inspired by the biological neural networks of animals, and in particular the brain. These models can be used to estimate or approximate systems and cognitive functions that depend on a large number of inputs and weights of the connections which are generally unknown. ANNs are often embodied as so-called "neuromorphic" systems of interconnected processor elements that act as simulated "neurons" that exchange "messages" between each other in the form of electronic signals. The connections in ANNs that carry electronic messages between simulated neurons are provided with numeric weights that correspond to the strength or weakness of a given connection. These numeric weights can be adjusted and tuned based on experience, making ANNs adaptive to inputs and capable of learning. For example, an ANN for handwriting recognition is defined by a set of input neurons which can be activated by the pixels of an input image. After being weighted and transformed by a function determined by the network's designer, the activations of these input neurons are then passed to other downstream neurons. This process is repeated until an output neuron is activated. The activated output neuron determines which character was read.

ANNs can be trained with an incremental or stochastic gradient descent (SGD) process, in which the error gradient of each parameter (weight $w_{ij}$) is calculated using backpropagation. All of the operations performed on the weight matrix W during this backpropagation process can be implemented with the analog crossbar array 10 of transition probability matrix device 22 having a corresponding number of m rows and n columns, where the stored conductance values in the analog crossbar array 10 form the matrix W.

Referring back to FIG. 1, regarding analog vector-matrix multiplication on the transition probability matrix device array, analog vector-matrix multiplication involves a set of digital input values ($\delta$) 24, where each of the digital input values ($\delta$) 24 is represented by a respective analog signal pulse width. The analog signal pulse widths are provided as inputs to the array and the generated current signals are input to an operational amplifier (op-amp) integrating circuit 30 having an op-amp 34 with a capacitor ($C_{int}$) 32 connected to (across) the inverting input of the op-amp 34 and the output of the op-amp 34. The non-inverting input of the op-amp 34 is connected to ground. The output of the op-amp 34 is also connected to an input of an Analog-to-Digital Converter (ADC) 36. The ADC 36 outputs a signal $y_1$, representing a (digitized) result of the analog vector-matrix multiplication on the analog crossbar array 10 including the transition probability matrix devices 22.

For complete integration time, analog noise is accumulated at the op-amp 34. When the input values ($\delta$) 24 get too small (e.g., such as for the backward pass), the output signal is buried by the noise integrated for a cycle (SNR~0) and produces an incorrect result. Although the actual pulse duration is much shorter than the complete integration time, the ADC 36 waits for a complete cycle to evaluate the analog output from the op-amp 34.

The vector-matrix multiplication performed on the transition probability matrix array 20 is analog in nature and therefore prone to various sources of noise. Thus, a noise/bound management unit or component (not shown) can perform a noise reduction operation. A digital-to-analog converter (not shown) can provide digital inputs 40 as input to the transition probability matrix device 22 as analog pulse widths 24. The transition probability matrix array 20 is a rectangular region which is being used. By the term "used," it is meant that the transition probability matrix devices 22 are loaded with conductance's corresponding to their weights. The (analog) outputs 42 from the transition probability matrix array 20 can be converted into a vector of digital outputs by an analog-to-digital converter (not shown). The result of the vector-matrix multiplication is an analog voltage, and, therefore, the results are bounded by the signal limits imposed by the circuits. Thus, a noise/bound management unit or component (not shown) can perform noise reduction operations to make sure that the results at the output of the transition probability matrix array 20 are always within the range of an acceptable voltage swing.

Figure 2:
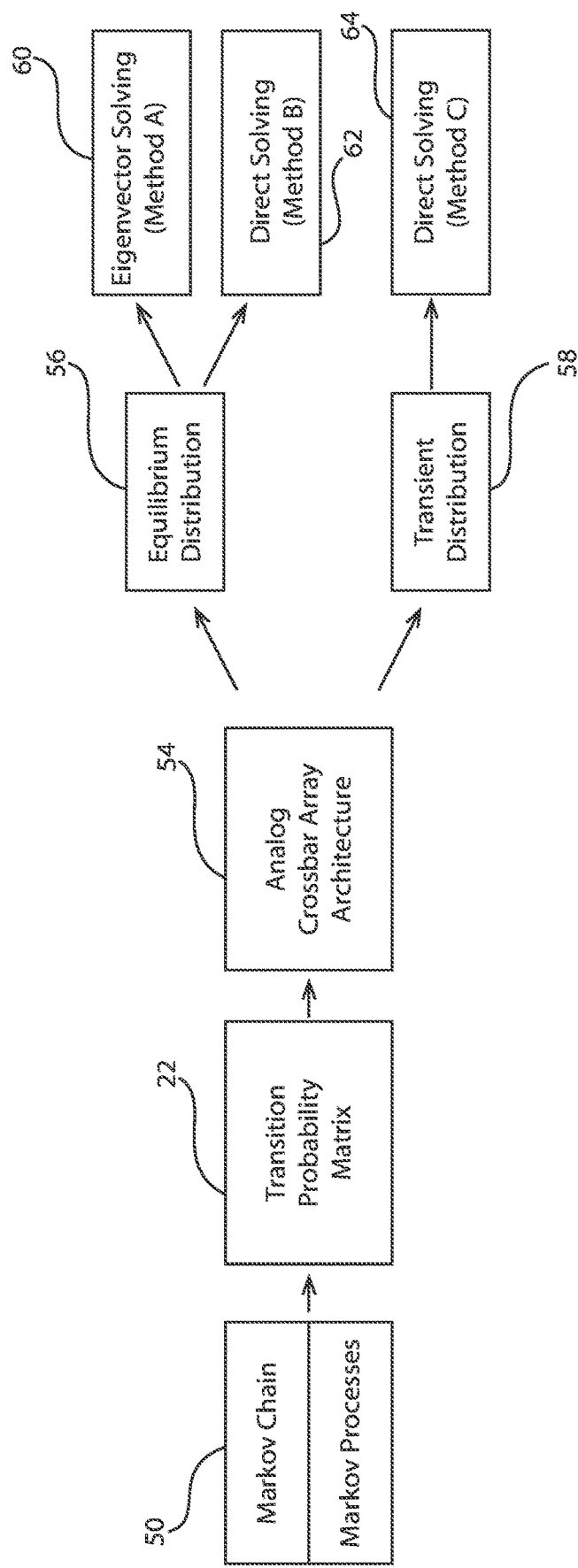
FIG. 2 is a block/flow diagram illustrating employing transition matrices to compute the equilibrium distribution and/or the transient distribution, in accordance with an embodiment of the present invention.

FIG. 2 is a block/flow diagram illustrating employing transition matrices to compute the equilibrium distribution and/or the transient distribution, in accordance with an embodiment of the present invention.

Markov chains or Markov processes 50 can be represented as a transition probability matrix incorporated in probability transition matrix devices 22. Transition probability matrices can be incorporated into analog crossbar array 54, as detailed with respect to the exemplary embodiments of the present invention. The transition probability devices 22 including transition probability matrices of the analog crossbar array 54 help compute the equilibrium distribution 56 and the transient distribution 58.

The equilibrium distribution 56 can be referred to as a steady-state distribution or a stationary distribution, which represents the steady-state probability of being in each state of a Markov chain. The transient distribution 58 represents the probability of being in each state of a Markov chain at a time t.

Equilibrium distribution 58 of a Markov chain $\pi = (\pi_k)_{\forall k}$ can be obtained with the transition probability matrix P associated with the Markov chain, for any $\pi_0$, as:

$$\pi_t = \pi_{t-1}P \text{ and } \pi = \lim_{t \to \infty} \pi_t \Rightarrow \pi = \pi P$$

Matrix P has special properties where all the entries are nonnegative and the summation of the entries along each row is equal to 1 (P is a stochastic matrix).

Matrix P can be very sparse in many Markov chains, which is not ideally represented by analog devices due to the possible loss of sign information.

The issue can be interpreted as a single eigenvector solving for $\lambda=1$, namely, where $\pi$ is a row eigenvector of probability matrix P associated with eigenvalue $\lambda=1$.

Note that all the other eigenvalues of P are complex values within the unit disk, all having a real part strictly less than 1.

Transient distribution 58 of a Markov chain $\pi_t = (\pi_k)_{t, \forall k}$ can be obtained with the transition probability matrix P associated with the Markov chain, for any $\pi_0$, as:

$$\pi_t = \pi_{t-1}P \Rightarrow \pi_t = \pi_0 P^t$$

Matrix P has special properties where all the entries are nonnegative and the summation of the entries along each row is equal to 1 (P is a stochastic matrix).

Matrix P can be very sparse in many Markov chains, which is not ideally represented by analog devices due to the possible loss of sign information.

The issue can be considered within the context of the power method based on an algorithm for computing eigenvectors associated with eigenvalues of the equilibrium distribution 56 and the transient distribution 58.

The equilibrium distribution 56 can be solved by eigenvector solving 60 or by direct solving 62. The transient distribution 58 can be solved by direct solving 64. Eigenvector solving 60 is outlined in FIG. 3, direct solving 62 for the equilibrium distribution 56 is outlined in FIG. 4, and direct solving 64 for the transient distribution 58 is outlined in FIG. 5.

Figure 3:
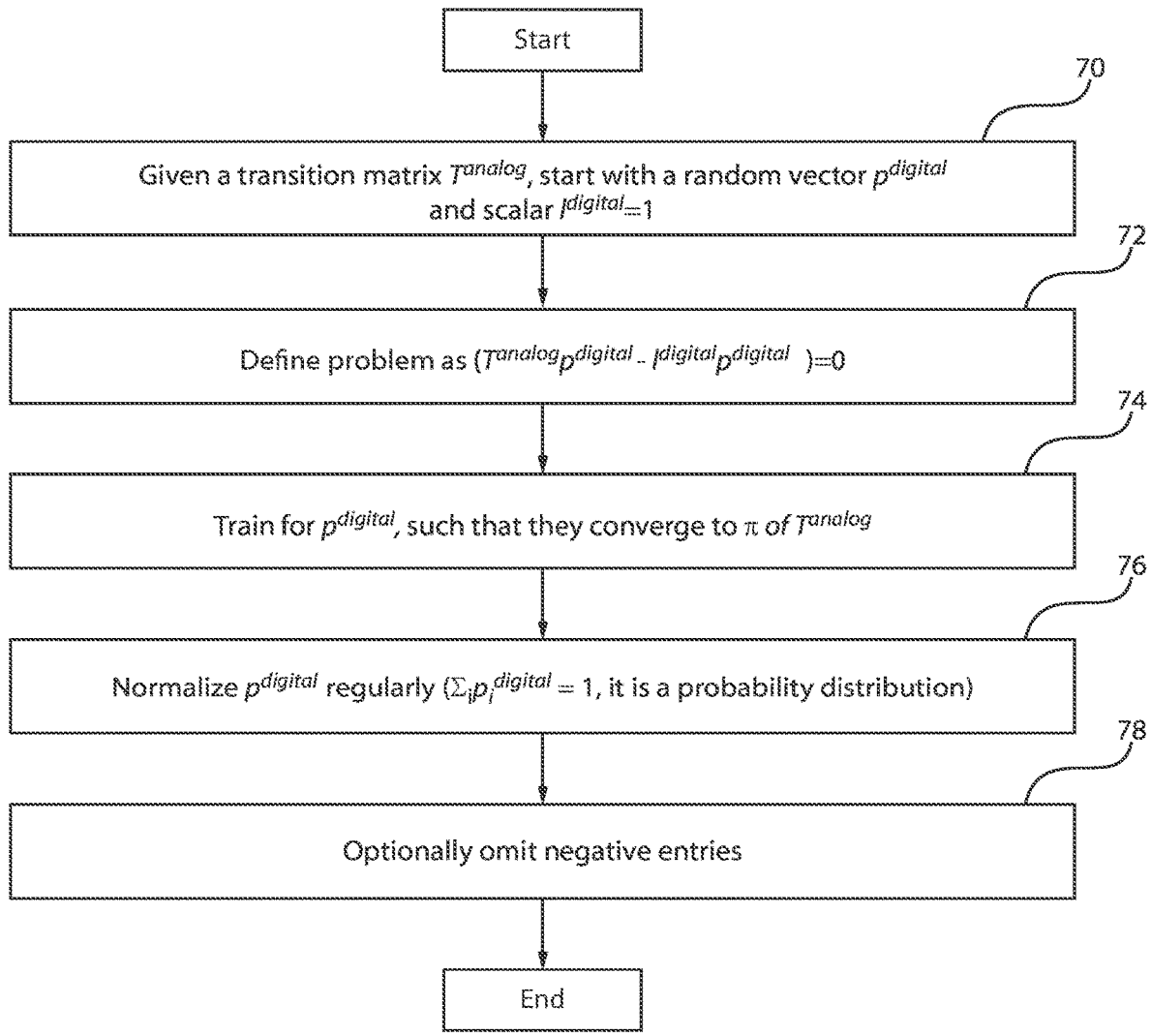
FIG. 3 is a block/flow diagram of an exemplary method for computing equilibrium distribution by employing eigenvector solving, in accordance with an embodiment of the present invention.

FIG. 3 is a block/flow diagram of an exemplary method for computing equilibrium distribution by employing eigenvector solving, in accordance with an embodiment of the present invention.

At block 70, given a transition probability matrix $T^{analog}$, start with a random vector $p^{digital}$ and scalar $1^{digital}=1$.

At block 72, define the problem as $(T^{analog}p^{digital}-1^{digital}p^{digital})=0$.

At block 74, train for $p^{digital}$, such that they converge to $\pi$ of $T^{analog}$.

At block 76, normalize $p^{digital}$ regularly ($\Sigma_i p_i^{digital}=1$, it is a probability distribution).

At block 78, optionally omit negative entries of the equilibrium distribution and transient distribution.

The first procedure (Method A) computes the equilibrium distribution of a Markov Chain by computing the eigenvector associated with the real eigenvalue of modulus one of the transition probability matrix P. This is achieved by mapping the transition probability matrix to an analog crossbar array and applying a gradient-based eigenvalue solver to converge to the dominant eigenpair. More specifically, let 'x' denote the vector representing an initial approximation of the equilibrium distribution. The gradient-based eigenvalue solver performs a number of iterations, where in each iteration the exemplary method computes the matrix-vector product z=x'(P−I) and updates x=x−2η(P−I)z', where η denotes the learning rate. The matrix-vector products with the transition probability matrix P are performed using an analog crossbar array. Once the dominant eigenvector is computed, it is scaled so that the sum of its entries is equal to one. 'x' can refer to column vectors, whereas 'z' can refer to row vectors.

Figure 4:
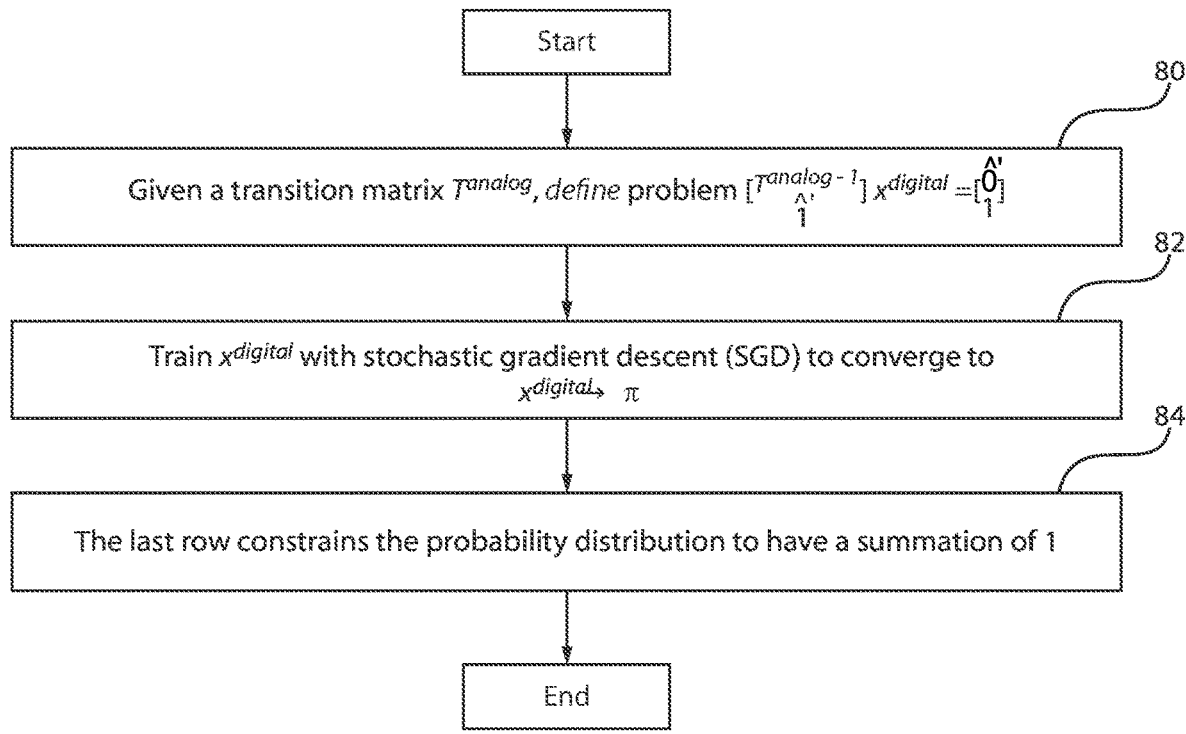
FIG. 4 is a block/flow diagram of an exemplary method for computing equilibrium distribution by employing direct solving, in accordance with an embodiment of the present invention.

FIG. 4 is a block/flow diagram of an exemplary method for computing equilibrium distribution by employing direct solving, in accordance with an embodiment of the present invention.

At block 80, given a transition probability matrix $T^{analog}$, define problem $$\begin{bmatrix} T^{analog} - I \\ \hat{1}' \end{bmatrix} x^{digital} = \begin{bmatrix} \hat{0}' \\ 1 \end{bmatrix}, \hat{1}'$$

is a row vector of size n with all entries equal to 1. $\hat{0}'$ is a column vector of size n with all entries equal to 0.

At block 82, train $x^{digital}$ with stochastic gradient descent (SGD) to converge to $x^{digital} \to \pi$.

At block 84, the last row constraints the probability distribution to have a summation of 1.

The second procedure (Method B) computes the equilibrium distribution of a Markov Chain by solving an augmented linear system. This linear system is solved by a stochastic gradient descent-based procedure in which the rows of the transition probability matrix are used as the data samples. The solution of the linear system is scaled so that the sum of its entries is equal to one. More specifically, let Ax=b denote the linear system of interest, where $$A = \begin{bmatrix} T^{analog} - I \\ \hat{1}' \end{bmatrix} \text{ and } b = \begin{bmatrix} \hat{0}' \\ 1 \end{bmatrix}.$$

The exemplary system computes an approximation to 'x' by an iterative process where in each iteration the exemplary method updates x=x+ηA'(b−Ax), where η denotes the learning rate. The matrix-vector products with the transition probability matrix A are performed using an analog crossbar array. In the instant case, the exemplary method sets A=(P−I) and 'b' equal to zero. At each iteration, the approximate equilibrium distribution vector x is scaled so that the sum of its entries is equal to one.

Figure 5:
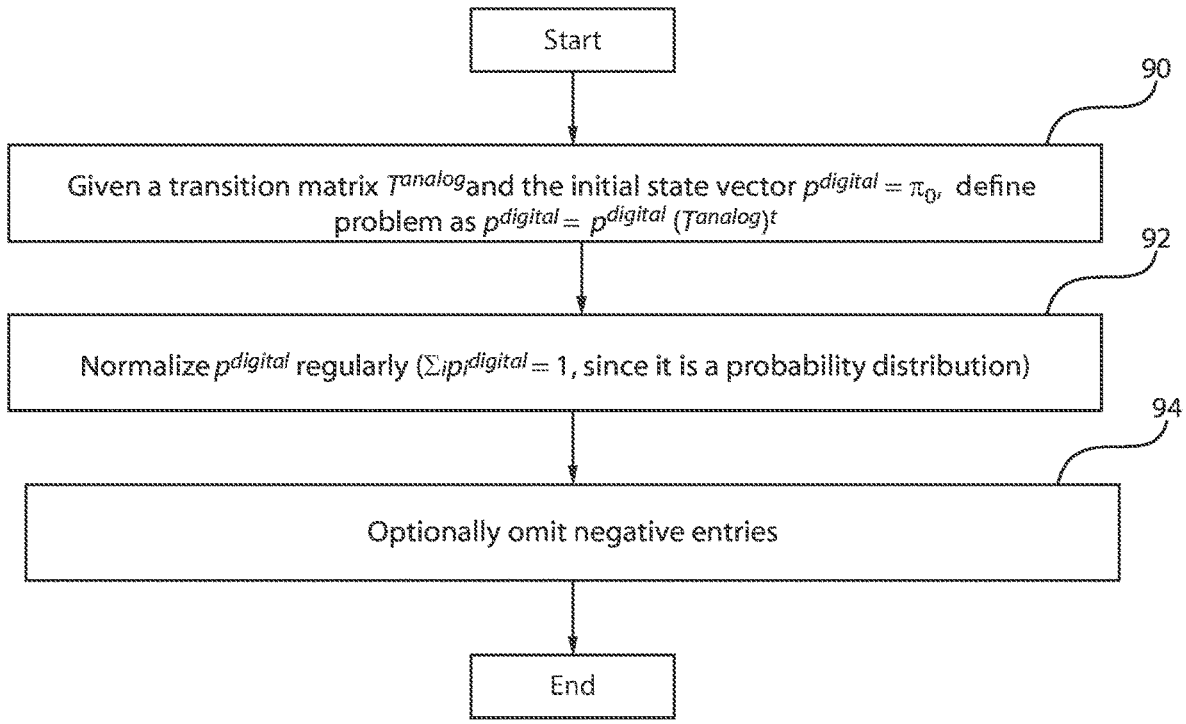
FIG. 5 is a block/flow diagram of an exemplary method for computing transient distribution by employing direct solving, in accordance with an embodiment of the present invention.

FIG. 5 is a block/flow diagram of an exemplary method for computing transient distribution by employing direct solving, in accordance with an embodiment of the present invention.

At block 90, given the transition probability matrix $T^{analog}$ and the initial state vector $p^{digital}=\pi_0$, define problem as $p^{digital}=p^{digital}(T^{analog})^t$.

At block 92, normalize $p^{digital}$ regularly ($\Sigma_i p_i^{digital}=1$, since it is a probability distribution).

At block 94, optionally omit negative entries of the equilibrium distribution and transient distribution.

The third procedure (Method C) computes the transient distribution of a Markov chain after 't' steps by first copying the transition probability matrix P to an analog crossbar array and performing a sequence of 't' matrix-vector products with a vector 'x' which denotes an random initialization.

Figure 6:
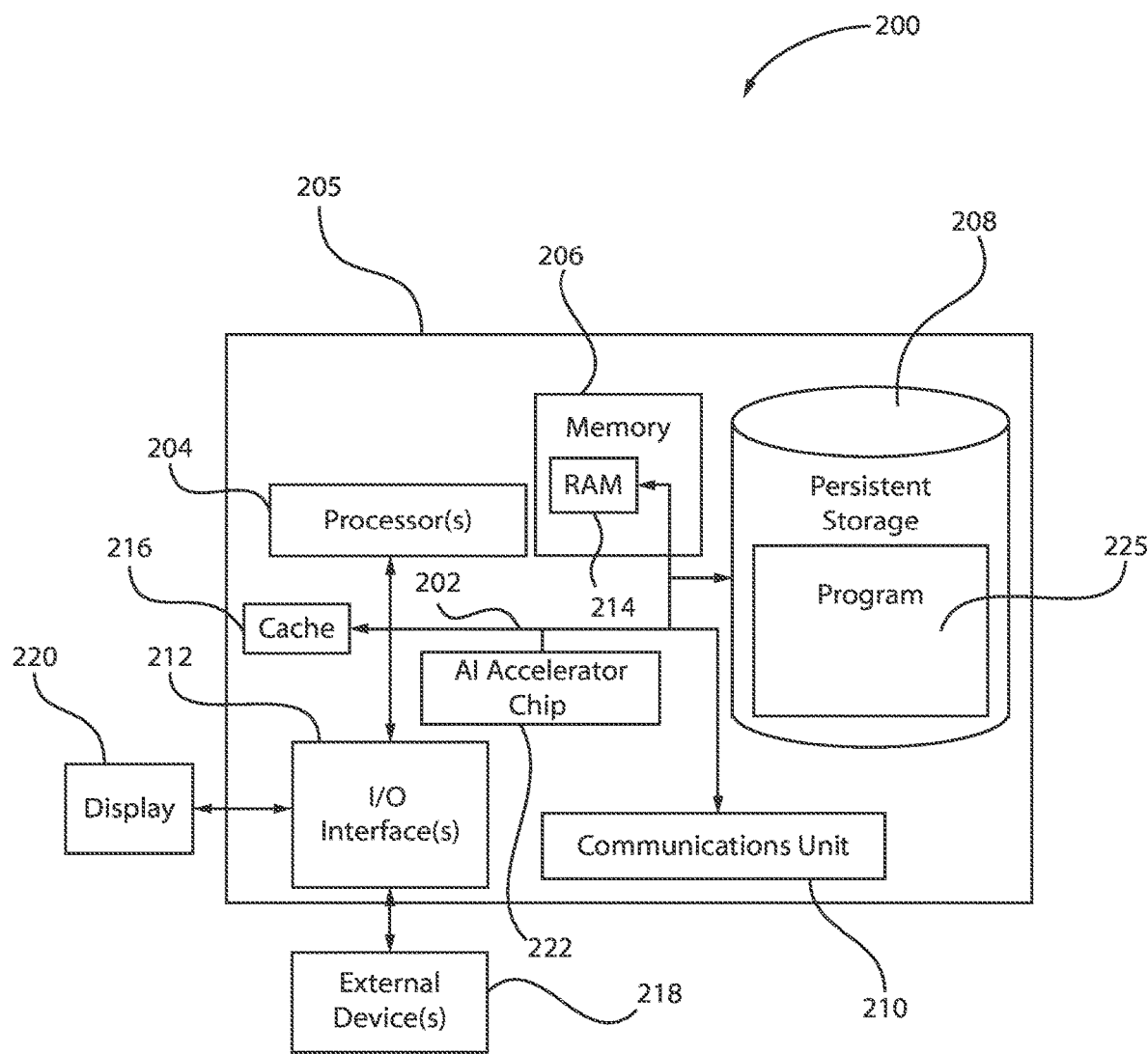
FIG. 6 is a block/flow diagram of an exemplary processing system for the analog crossbar array employing the transition matrices, in accordance with an embodiment of the present invention.

FIG. 6 is a block/flow diagram of an exemplary processing system for the analog crossbar array employing the transition matrices, in accordance with an embodiment of the present invention.

FIG. 6 depicts a block diagram of components of system 200, which includes computing device 205. It should be appreciated that FIG. 6 provides only an illustration of one implementation and does not imply any limitations with regard to the environments in which different embodiments can be implemented. Many modifications to the depicted environment can be made.

Computing device 205 includes communications fabric 202, which provides communications between computer processor(s) 204, memory 206, persistent storage 208, communications unit 210, and input/output (I/O) interface(s) 212. Communications fabric 202 can be implemented with any architecture designed for passing data and/or control information between processors (such as microprocessors, communications and network processors, etc.), system memory, peripheral devices, and any other hardware components within a system. For example, communications fabric 202 can be implemented with one or more buses.

Memory 206, cache memory 216, and persistent storage 208 are computer readable storage media. In this embodiment, memory 206 includes random access memory (RAM) 214. In another embodiment, the memory 206 can be flash memory. In general, memory 206 can include any suitable volatile or non-volatile computer readable storage media.

In some embodiments of the present invention, program 225 is included and operated by AI accelerator chip 222 as a component of computing device 205. In other embodiments, program 225 is stored in persistent storage 208 for execution by AI accelerator chip 222 in conjunction with one or more of the respective computer processors 204 via one or more memories of memory 206. AI accelerator chip 222 can employ equilibrium distributions and transient distributions of Markov chains processed in the analog crossbar array 10 including the transition probability matrix devices 22.

In this embodiment, persistent storage 208 includes a magnetic hard disk drive. Alternatively, or in addition to a magnetic hard disk drive, persistent storage 208 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 208 can also be removable. For example, a removable hard drive can be used for persistent storage 208. Other examples include optical and magnetic disks, thumb drives, and smart cards that are inserted into a drive for transfer onto another computer readable storage medium that is also part of persistent storage 208.

Communications unit 210, in these examples, provides for communications with other data processing systems or devices, including resources of distributed data processing environment. In these examples, communications unit 210 includes one or more network interface cards. Communications unit 210 can provide communications through the use of either or both physical and wireless communications links. Program 225 can be downloaded to persistent storage 208 through communications unit 210.

I/O interface(s) 212 allows for input and output of data with other devices that can be connected to computing system 200. For example, I/O interface 212 can provide a connection to external devices 218 such as a keyboard, keypad, a touch screen, and/or some other suitable input device. External devices 218 can also include portable computer readable storage media such as, for example, thumb drives, portable optical or magnetic disks, and memory cards.

Display 220 provides a mechanism to display data to a user and can be, for example, a computer monitor.

Figure 7:
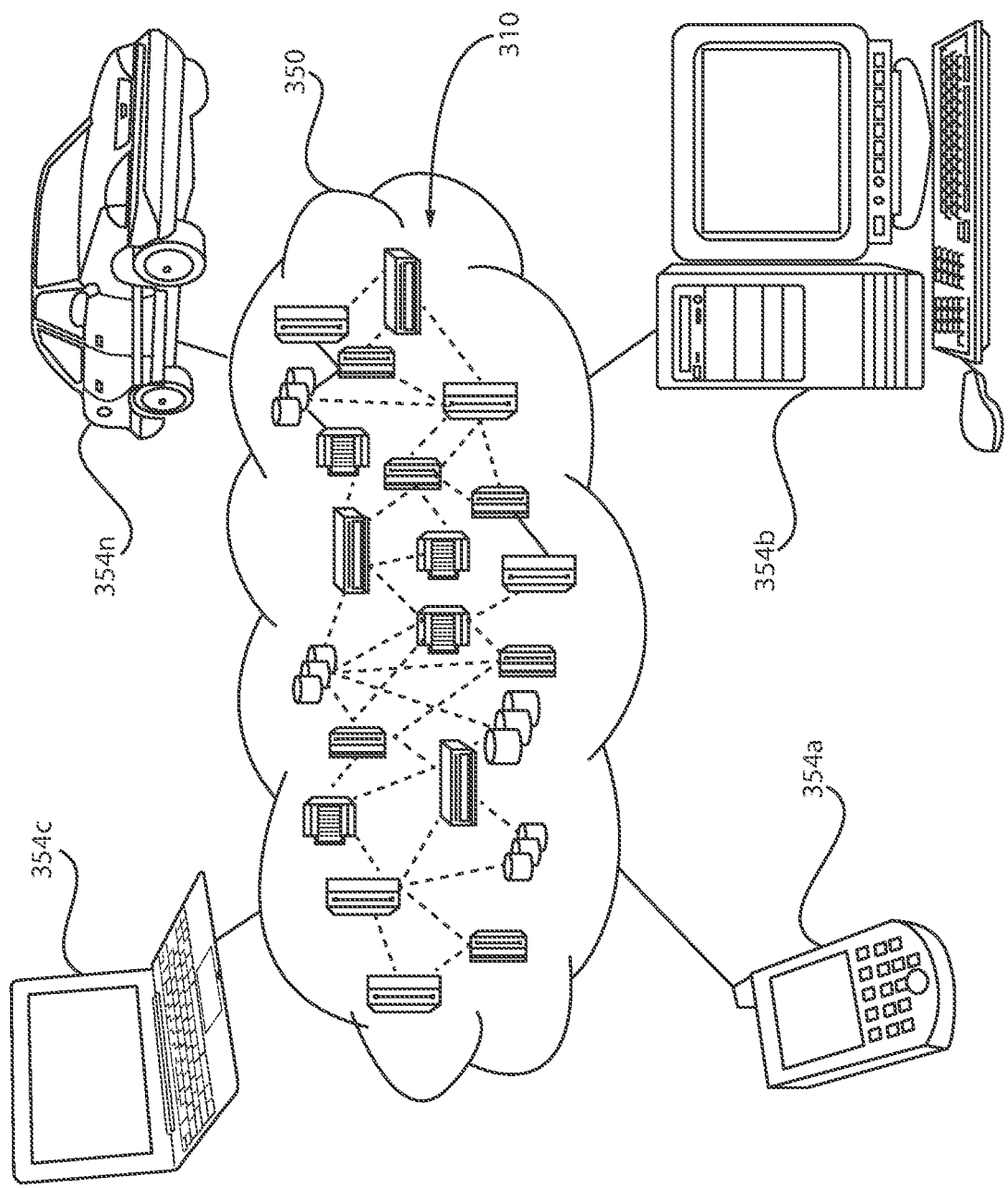
FIG. 7 is a block/flow diagram of an exemplary cloud computing environment, in accordance with an embodiment of the present invention.

FIG. 7 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 350 is depicted for enabling use cases of the present invention. As shown, cloud computing environment 350 includes one or more cloud computing nodes 310 with which local computing devices used by cloud consumers, such as, for example, personal digital assistant (PDA) or cellular telephone 354A, desktop computer 354B, laptop computer 354C, and/or automobile computer system 354N can communicate. Nodes 310 can communicate with one another. They can be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 7 are intended to be illustrative only and that computing nodes 310 and cloud computing environment 350 can communicate with any type of computerized device over any type of network and/or network addressable connection (e.g., using a web browser).

Figure 8:
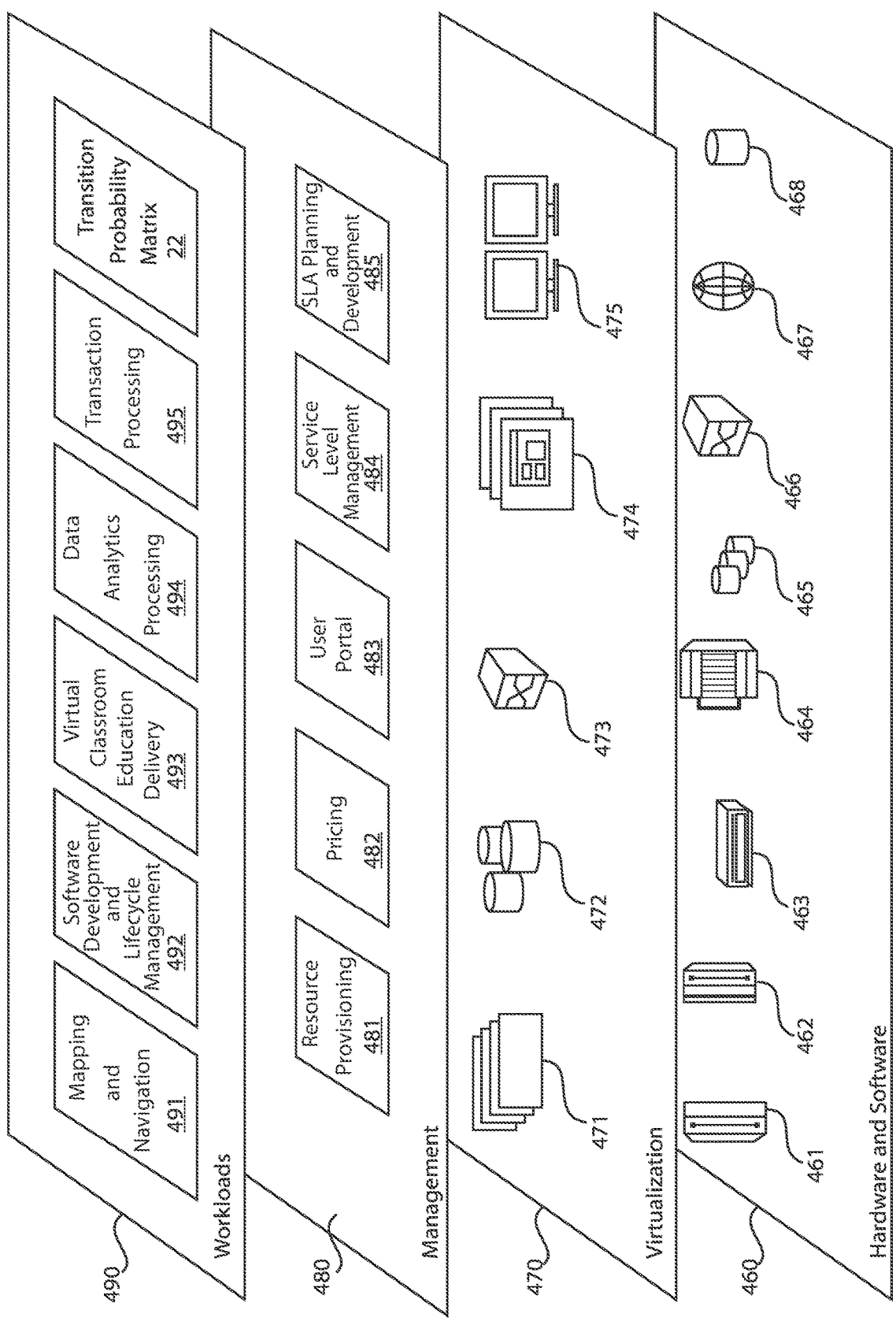
FIG. 8 is a schematic diagram of exemplary abstraction model layers, in accordance with an embodiment of the present invention.

FIG. 8 is a schematic diagram of exemplary abstraction model layers, in accordance with an embodiment of the present invention.

It should be understood in advance that the components, layers, and functions shown in FIG. 8 are intended to be illustrative only and embodiments of the invention are not limited thereto. As depicted, the following layers and corresponding functions are provided:

Hardware and software layer 460 includes hardware and software components. Examples of hardware components include: mainframes 461; RISC (Reduced Instruction Set Computer) architecture based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities can be provided: virtual servers 471; virtual storage 472; virtual networks 473, including virtual private networks; virtual applications and operating systems 474; and virtual clients 475.

In one example, management layer 480 can provide the functions described below. Resource provisioning 481 provides dynamic procurement of computing resources and other resources that are utilized to perform tasks within the cloud computing environment. Metering and Pricing 482 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 483 provides access to the cloud computing environment for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment can be utilized. Examples of workloads and functions which can be provided from this layer include: mapping and navigation 441; software development and lifecycle management 492; virtual classroom education delivery 493; data analytics processing 494; transaction processing 495; and the transition probability matrix devices 22 employing transition probability matrices for computing equilibrium distributions and transient distributions of Markov chains.

Figure 9:
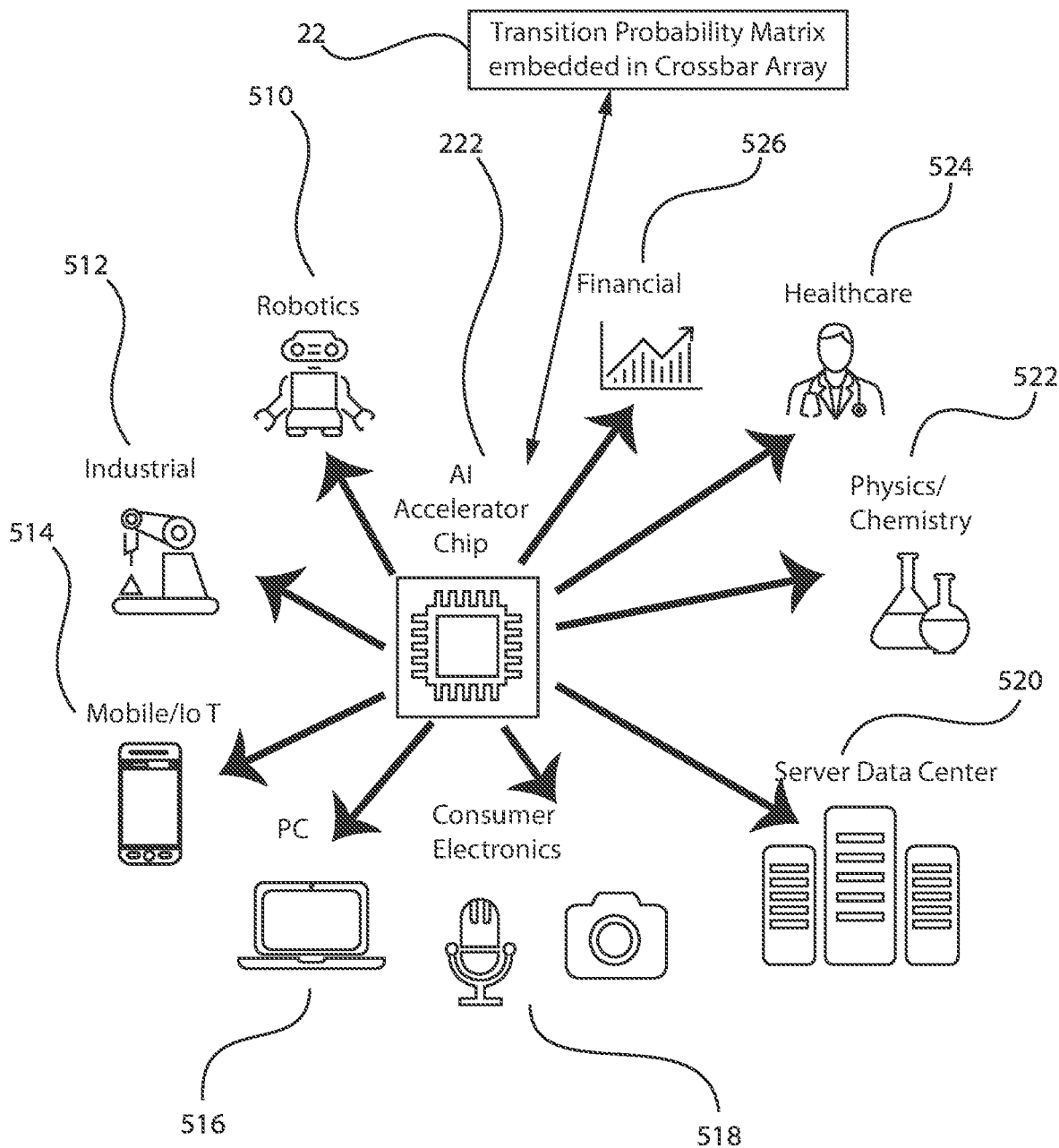
FIG. 9 illustrates practical applications for the analog crossbar array employing the transition matrices, in accordance with an embodiment of the present invention.

FIG. 9 illustrates practical applications for the analog crossbar array employing the transition matrices, in accordance with an embodiment of the present invention.

The artificial intelligence (AI) accelerator chip 222 can implement the probability matrix devices 22 employing transition probability matrices, and can be used in a wide variety of practical applications, including, but not limited to, robotics 510, industrial applications 512, mobile or Internet-of-Things (IoT) 514, personal computing 516, consumer electronics 518, server data centers 520, physics and chemistry applications 522, healthcare applications 524, and financial applications 526.

Therefore, since Markov chains can be designed to model many real-world processes, Markov chains are used in a wide variety of situations. These fields range from the mapping of animal life populations to search-engine algorithms, music composition and speech recognition. In economics and finance, Markov chains are often used to predict macroeconomic situations like market crashes and cycles between recession and expansion. Other areas of application include predicting asset and option prices, and calculating credit risks. When considering a continuous-time financial market Markov chains are used to model the randomness.

In the application of Markov chains to credit risk measurement, the transition probability matrix represents the likelihood of the future evolution of the ratings. The transition probability matrix will describe the probabilities that a certain company, country, etc. will either remain in their current state, or transition into a new state. Markov chains and their respective diagrams can be used to model the probabilities of certain financial market climates and thus predicting the likelihood of future market conditions. Therefore, the exemplary embodiments of the present invention can be applied to several real-world practical applications.

In conclusion, the exemplary embodiments of the present invention disclose methods and systems that employ analog crossbar hardware to compute distributions of Markov chains, such as, but not limited to, equilibrium distributions and transient distributions. The noisy and stochastic nature of the analog crossbar introduces errors to the probability distributions found via any of the methods. Nonetheless, in the case of the equilibrium distribution, the output is a very good initial guess for high order iterative methods (such as power method or subspace methods) that converge fast (only few iterations) given that the initial point is good enough. This way, the equilibrium probability distribution can be efficiently found with digital accuracy without introducing too much overhead. The same holds true for the transient distribution and values of t not too large, such that a mixture of analog and digital computations can be used for most reasonable values of t of interest in practice.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a system and method for using analog crossbar arrays employing transition probability matrices of Markov processes (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for computing an equilibrium distribution of Markov processes, the method comprising:
  storing weight values in an analog crossbar array of transition probability matrix devices, wherein the weight values in the analog crossbar array of transition probability matrix devices represent a weight matrix with m rows and n columns;
  computing, by a processor, an eigenvector associated with a real eigenvalue of modulus one for each of the weight values from the transition probability matrix devices;
  applying, by a processor, a gradient-based eigenvalue solver to converge to a dominant eigenpair;
  determining a probability of changing from one state to another state in a stochastic entity based on outcomes of the gradient-based eigenvalue solver; and
  performing a process with an artificial intelligence (AI) model using an AI accelerator chip that employs the equilibrium distribution of Markov processes.

2. The computer-implemented method of claim 1, wherein the gradient-based eigenvalue solver performs a number of iterations, wherein each iteration is a matrix-vector product.

3. The computer-implemented method of claim 2, wherein the matrix-vector product is given as $z=x'(P-I)$ and an update is given as $x=x-2\eta(P-I)z'$, where $\eta$ denotes a learning rate, P is a transition probability matrix, I is an initial state, x denotes a vector representing an initial approximation of the equilibrium distribution, x' represents column vectors, and z' represents row vectors.

4. The computer-implemented method of claim 3, wherein each of the matrix-vector products with the transition probability matrix are performed using the analog crossbar array.

5. The computer-implemented method of claim 4, wherein, once the dominant eigenpair is computed, the dominant eigenpair is scaled so that a sum of its entries is equal to one.

6. The computer-implemented method of claim 1, wherein the transition probability matrices include all probabilities that a variable will transition from one state to another, or remain the same.

7. The computer-implemented method of claim 1, wherein negative entries are omitted from the equilibrium distribution.

8. A computer-implemented method for computing an equilibrium distribution of Markov processes, the method comprising:
  storing weight values in an analog crossbar array of transition probability matrix devices, wherein the weight values in the analog crossbar array of transition probability matrix devices represent a weight matrix with m rows and n columns;
  solving an augmented linear system by solving a stochastic gradient descent-based procedure in which the rows of the weight values of the transition probability matrix devices are used as data samples;

scaling a solution of the augmented linear system so that a sum of its entries is equal to one;

determining a probability of changing from one state to another state in a stochastic entity; and performing a process with an artificial intelligence (AI) model using an AI accelerator chip that employs the equilibrium distribution of Markov processes.

9. The computer-implemented method of claim 8, wherein the augmented linear system computes an approximation to x by an iterative process, where x denotes a vector representing an initial approximation of the equilibrium distribution.

10. The computer-implemented method of claim 9, wherein, in each iteration, $x=x+\eta A'(b-Ax)$ is updated, where n denotes a learning rate, $$A = \begin{bmatrix} T^{analog} - I \\ \hat{1}' \end{bmatrix} \text{ and } b = \begin{bmatrix} \hat{0}' \\ 1 \end{bmatrix}.$$

11. The computer-implemented method of claim 10, wherein matrix-vector products with the transition probability matrix A are performed using the analog crossbar array.

12. The computer-implemented method of claim 9, wherein A=(P−I) and b is set to zero, where I is an initial state, P is transition probability matrix, and $$b = \begin{bmatrix} \hat{0}' \\ 1 \end{bmatrix}.$$

13. The computer-implemented method of claim 9, wherein, at each iteration, an approximate equilibrium distribution vector x is scaled so that a sum of its entries is equal to one.

14. The method computer-implemented of claim 8, wherein negative entries are omitted from the equilibrium distribution.

15. A computer program product for computing an equilibrium distribution of Markov processes, the computer program product comprising a computer readable storage medium having program instructions embodied therewith, the program instructions executable by a computer to cause the computer to:

store weight values in an analog crossbar array of transition probability matrix devices, wherein the weight values in the analog crossbar array of transition probability matrix devices represent a weight matrix with m rows and n columns;

compute an eigenvector associated with a real eigenvalue of modulus one for each of the weight values from the transition probability matrix devices;

apply a gradient-based eigenvalue solver to converge to a dominant eigenpair;

determine a probability of changing from one state to another state in a stochastic entity based on outcomes of the gradient-based eigenvalue solver; and performing a process with an artificial intelligence (AI) model using an AI accelerator chip that employs the equilibrium distribution of Markov processes.

16. The computer program product of claim 15, wherein the gradient-based eigenvalue solver performs a number of iterations, wherein each iteration is a matrix-vector product.

17. The computer program product of claim 16, wherein the matrix-vector product is give as $z=x'(P-I)$ and an update is given as $x=x-2\eta(P-I) z'$, where $\eta$ denotes a learning rate, P is a transition probability matrix, I is an initial state, x denotes a vector representing an initial approximation of the equilibrium distribution, x' represents column vectors, and z' represents row vectors.

18. The computer program product of claim 17, wherein each of the matrix-vector products with the transition probability matrix are performed using the analog crossbar array.

19. The computer program product of claim 18, wherein, once the dominant eigenpair is computed, the dominant eigenpair is scaled so that a sum of its entries is equal to one.

20. The computer program product of claim 15, wherein negative entries are omitted from the equilibrium distribution.

* * * * *